US012361079B2

(12) United States Patent
Diamandis et al.

(10) Patent No.: US 12,361,079 B2
(45) Date of Patent: Jul. 15, 2025

(54) COMPUTER-IMPLEMENTED PERSONALIZED PERSPECTIVE SEARCH USING TRAINED AVATAR MECHANISMS AND MULTI-DIMENSIONAL VECTOR REPRESENTATIONS

(71) Applicant: Futureloop Inc., Culver City, CA (US)

(72) Inventors: Peter H. Diamandis, Santa Monica, CA (US); Morgan Rawls-McDermott, Portland, OR (US); Eben Pagan, Sunny Isles Beach, FL (US)

(73) Assignee: DAILY.AI, INC., Austin, TX (US)

( * ) Notice: Subject to any disclaimer, the term of this patent is extended or adjusted under 35 U.S.C. 154(b) by 0 days.

(21) Appl. No.: 18/082,931

(22) Filed: Dec. 16, 2022

(65) Prior Publication Data

US 2023/0229719 A1    Jul. 20, 2023

Related U.S. Application Data

(63) Continuation of application No. PCT/IB2021/054466, filed on May 23, 2021.

(60) Provisional application No. 63/045,915, filed on Jun. 30, 2020.

(51) Int. Cl.
    *G06F 16/9535* (2019.01)
    *G06F 16/9538* (2019.01)
    *G06N 20/00* (2019.01)

(52) U.S. Cl.
    CPC ...... *G06F 16/9535* (2019.01); *G06F 16/9538* (2019.01); *G06N 20/00* (2019.01)

(58) Field of Classification Search
    CPC ............... G06F 16/9535; G06F 16/248; G06F 16/9536; G06F 16/9538; G06F 16/337; G06N 20/00

USPC ........ 707/707, 722, 736, 738, 748, 758, 769
See application file for complete search history.

(56) References Cited

U.S. PATENT DOCUMENTS

| 6,493,705 | B1 | 12/2002 | Kobayashi et al. |
| 10,540,399 | B2 | 1/2020 | Tabrizi et al. |
| 10,635,727 | B2 * | 4/2020 | Liu ......................... G06F 40/30 |
| 2006/0036685 | A1 * | 2/2006 | Canning ................. H04L 67/10 |
| | | | 709/204 |
| 2006/0074883 | A1 * | 4/2006 | Teevan ................ G06F 16/9535 |
| | | | 707/999.003 |
| 2010/0161640 | A1 | 6/2010 | Gustafson et al. |
| 2012/0221687 | A1 * | 8/2012 | Hunter .................. G06F 16/435 |
| | | | 709/219 |

(Continued)

OTHER PUBLICATIONS

WIPO, International Search Report received in International Application No. PCT/IB2021/054466, Sep. 17, 2021, (4p.).

(Continued)

*Primary Examiner* — Phong H Nguyen
(74) *Attorney, Agent, or Firm* — Siritzky Law, PLLC

(57) ABSTRACT

A method includes performing a search on a body of information based on a first perspective, wherein the first perspective is determined using a first corpus of information associated with a first particular set of people; and providing at least some results of the search. The search may be a perspective search. Results of the search may be evaluated based on a second perspective, which is based on a second corpus of information associated with a second particular set of people. The perspective may be determined using an avatar mechanism that was trained using a corpus of information.

32 Claims, 11 Drawing Sheets

(56) References Cited

U.S. PATENT DOCUMENTS

2014/0136546 A1* 5/2014 Satalkar ............. G06F 16/9535
       707/769
2020/0160199 A1   5/2020 Hasan et al.
2021/0109966 A1*  4/2021 Ayush .................. G06N 3/044

OTHER PUBLICATIONS

WIPO, International Written Opinion received in International Application No. PCT/IB2021/054466, Sep. 17, 2021, (8p.).

* cited by examiner

 SELECTED BY VIRTUAL DIAMANDIS
⊙ LIKED BY VIRTUAL KURZWEIL

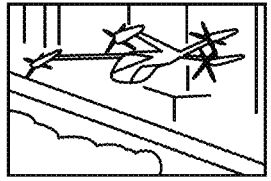 1. HYUNDAI AND UBER UNVEIL ELECTRIC FLYING TAXI CONCEPT. KOREAN CAR FIRM HYUNDAI HAS TEAMED UP WITH RIDE SHARING SERVICE UBER TO DEVELOP A PERSONAL AIR VEHICLE (PAV) CONCEPT THAT COULD BE USED AS AN ELECTRIC FLYING TAXI IN THE FUTURE. *LINK*

01/08/2020 *EMAIL TWITTER*

FIG. 3A

 SELECTED BY VIRTUAL KURZWEILL
⊙ LIKED BY VIRTUAL DIAMANDIS

 2. AN ARTIFICIAL NEURAL CONNECTION ALLOWS A NEW CORTICAL SITE TO CONTROL HAND MOVEMENTS. THIS RESEARCH WILL CONTRIBUTE TO THE DEVELOPMENT OF INNOVATIVE THERAPIES THAT WILL HELP STROKE PATIENTS REGAIN LOST MOTOR FUNCTION BY IMPARTING THIS FUNCTION TO REGIONS OF THE CEREBRAL CORTEX PREVIOUSLY NOT ASSOCIATED WITH HAND MOVEMENT. *LINK*

FIG. 3B

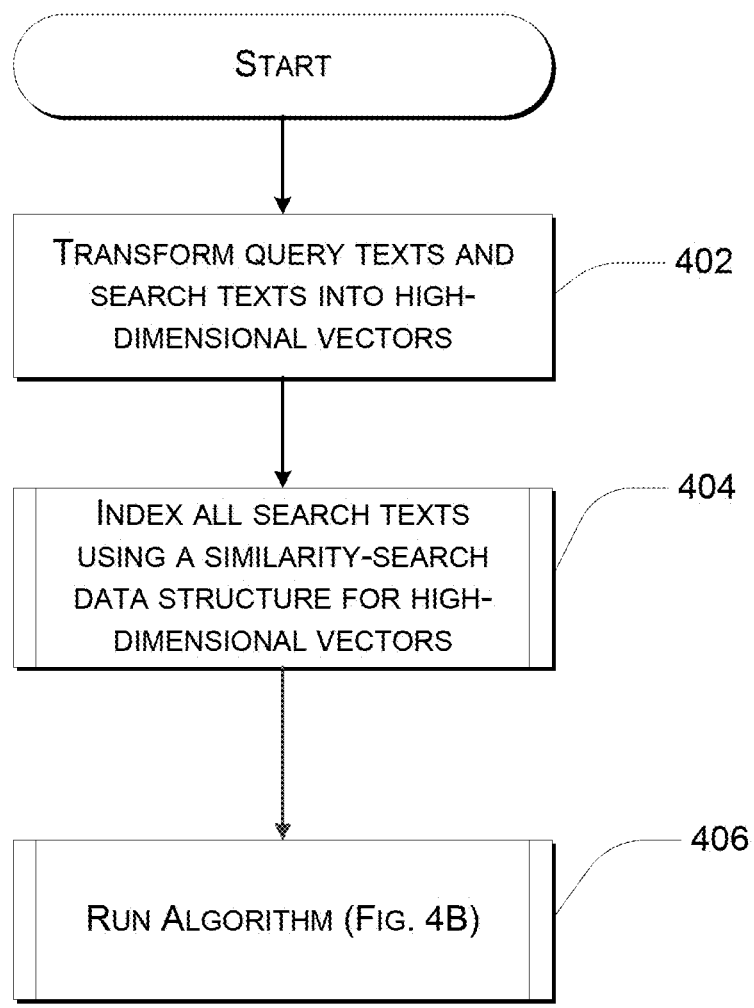

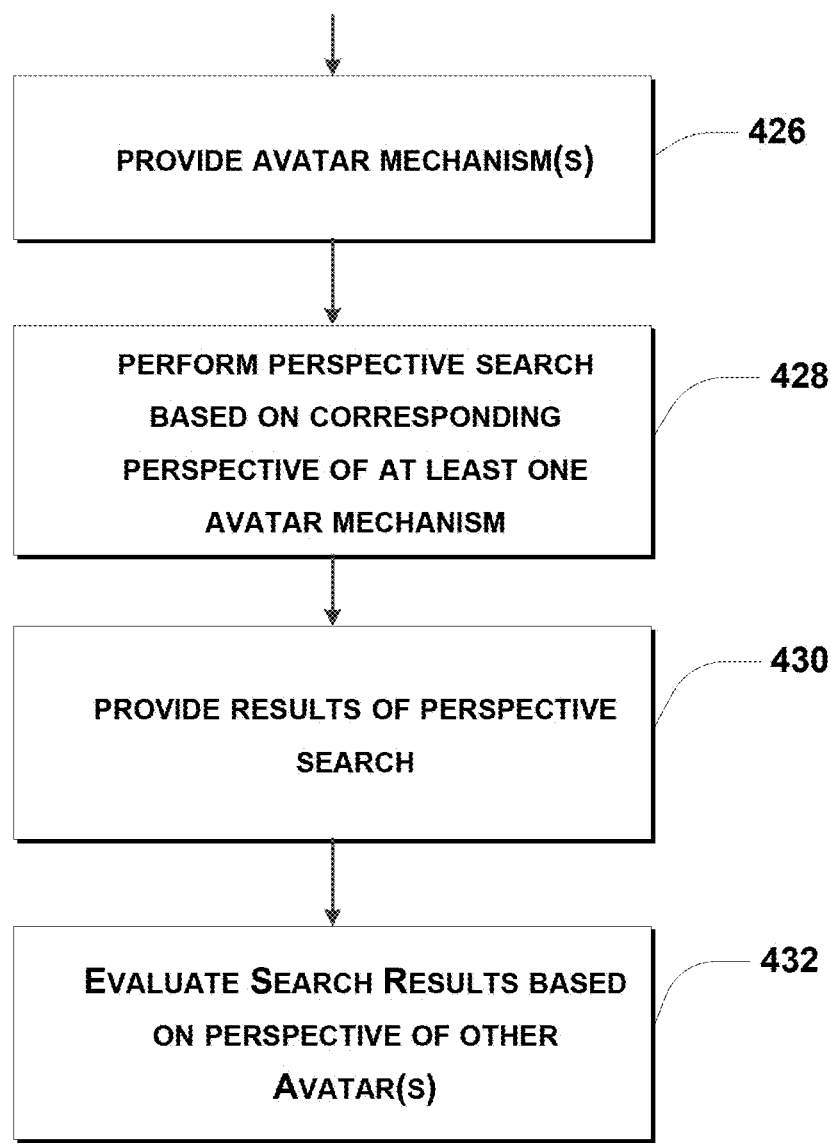

COMPUTER-IMPLEMENTED PERSONALIZED PERSPECTIVE SEARCH USING TRAINED AVATAR MECHANISMS AND MULTI-DIMENSIONAL VECTOR REPRESENTATIONS

RELATED APPLICATIONS

This application is a continuation of PCT/IB2021/054466, filed 23 May 2021, which claims the benefit of U.S. provisional application No. 63/045,915, filed Jun. 30, 2020, the entire contents of both of which are hereby fully incorporated herein by reference for all purposes.

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to intelligence systems, and, more specifically for systems, methods, and devices for searching data, and, even more particularly, for providing systems, methods, and devices for searching data based on the perspectives of others.

BACKGROUND

Every year, exponentially more data, including news, is produced and made available digitally to anyone in the world who has access to the Internet. This overwhelm of information makes it challenging for individual humans use this information to make accurate predictions about the future of themselves, their family, their locality, and the world.

The sheer volume of information, with new information being produced by the minute, makes it impossible for any human to sift through or evaluate data in any reasonable amount of time. Users are presented with few technological means to sift through information and to uncover true insight.

It is desirable and an object hereof to provide users with better ways to sift through or filter data.

It is also desirable and another object hereof to provide users with insights of others in evaluating or filtering or searching data.

SUMMARY

The present invention is specified in the claims as well as in the below description. Preferred embodiments are particularly specified in the dependent claims and the description of various embodiments.

In some aspects, the present invention provides a way to search a corpus of data (e.g., books, magazine articles, online posts, social network posts, etc.) and sift or filter the results based on what one or more other people may find useful or interesting. A search may be sifted or filtered from the perspectives of one or more other people. In this way, a potentially very large result set may be filtered or sifted to produce a smaller result set that represents the results from the perspective of one or more other people.

In some cases, a perspective mechanism may be used to determine the perspective of a particular person (e.g., a famous or influential person), and that person's perspective may be used to filter or sift or generate search results.

The perspective of a particular person may be determined based, at least in part, on their textual digital footprints (e.g., blog posts, social media posts, digitized books, transcribed videos, etc.). Anything written or said by the particular person may be used to determine or form their perspective. A mechanism that may search through a corpus with or from the perspective of a particular person may be referred to as an avatar mechanism.

Thus, in some aspects, an avatar mechanism for a particular person may be provided that may be used to search through a corpus as that person. In such cases, the avatar mechanism for that particular person will sift or filter or generate search results based on the perspective of that particular person.

In some aspects, multiple avatar mechanisms may be formed or generated for multiple particular people, each avatar mechanism corresponding to the perspective of a corresponding person. In such cases, more than one avatar mechanism may be used to generate search results based on the perspectives of more than one person.

In some aspects, multiple avatar mechanisms may form an avatar social network in which an avatar mechanism may post content that interests them (e.g., based on their perspective), and then one or more of the other avatar mechanisms may indicate a degree to which the posted content aligns with their perspectives.

In some aspects, an avatar mechanism may be used to have a conversation. For example, in some cases using a combination of a perspective engine algorithm and transformer-based language models with a specific training scheme and a new neural architecture, an avatar mechanism may generate responses given a textual prompt or textual context.

In some cases, conversational text produced by an avatar mechanism may be transformed into a corresponding audio and video representation (e.g., using text-to-speech processing, 3D character animation synthesis from speech, and generative motion transfer, etc.).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method that includes (a) performing a search on a body of information based on a first perspective, where the first perspective is determined using a first corpus of information associated with a first particular set of people. The method also includes (b) providing at least some results of the search. Other embodiments of this aspect include corresponding computer systems, apparatus, and computer programs recorded on one or more computer storage devices, each configured to perform the actions of the methods.

Implementations may include one or more of the following features, alone and/or in combination(s):

The method where the search may include a perspective search.

The method where the first corpus of information associated with the first particular set of people may include a first one or more of: books, magazine articles, online posts, social network posts, blog posts, social media posts, digitized books, and/or transcribed videos of or by or including the first particular set of people.

The method where the second perspective is based on a second corpus of information associated with a second particular set of people.

The method where the method may include: (d) providing an indication of agreement between the first perspective and the second perspective.

The method where the second particular set of people may include a second particular person.

The method where the second perspective was determined using a second avatar mechanism that was trained using the second corpus of information.

The method where the first particular set of people may include a first particular person.

The method where the first perspective corresponds to a first perspective of the first particular person, as emulated a first avatar mechanism that was trained using the first corpus of information.

The method where the first perspective was determined using a first avatar mechanism that was trained using the first corpus of information.

One general aspect includes a computer-implemented including performing a search on a body of information. The method also includes providing results of the search based on a first avatar mechanism that was trained using a first corpus of information.

Implementations may include one or more of the following features, alone and/or in combination(s):

The method where the method may include training the first avatar mechanism using the first corpus of information.

The method where the search may include a perspective search. The results of the search are based on a perspective of the first avatar mechanism.

The method where the providing may include filtering and/or sifting a set of search results based on the perspective of the first avatar mechanism.

The method where the first corpus of information may include information associated with a first set of one or more people.

The method where the first set of one or more people may include a first particular person.

The method where the results of the search are based on a perspective of the first particular person, as determined by the first avatar mechanism.

The method where a perspective of the first avatar mechanism emulates a particular perspective of the first particular person, and where the first corpus of information may include at least some information associated with the first particular person.

The method where the information associated with the first particular person may include one or more of: books, magazine articles, online posts, social network posts, blog posts, social media posts, digitized books, and/or transcribed videos of or by or including the first particular person.

The method where the second avatar mechanism was trained using a second corpus of information.

The method where the using may include determining whether the second avatar mechanism agrees with the first avatar mechanism.

The method where at least some of the results of the search are provided in a user interface, and where agreement of the second avatar mechanism with the first avatar mechanism is indicated in the user interface.

The method where the second corpus of information may include second information associated with a second set of one or more people.

The method where the second set of one or more people may include a second particular person.

One general aspect includes a computer-implemented method the includes (a) performing a perspective search on a body of information based on a corresponding perspective of at least one of one or more avatar mechanisms, where each of the one or more avatar mechanisms has a corresponding perspective based on a corresponding corpus of information. The method also includes (b) providing at least some results of the perspective search. Other embodiments of this aspect include corresponding computer systems, apparatus, and computer programs recorded on one or more computer storage devices, each configured to perform the actions of the methods.

Implementations may include one or more of the following features, alone and/or in combination(s):

The method where each of the one or more avatar mechanisms was trained using the corresponding corpus of information.

The method where the method may include training the one or more avatar mechanisms.

The method where the method may include evaluating a result of the perspective search based on a corresponding perspective of at least one other of the one or more avatar mechanisms.

The method where the method may include providing an indication of agreement between the at least some results and the at least one other of the one or more avatar mechanisms.

The method where the corresponding corpus of information for each avatar mechanism may include information associated with a corresponding one or more people.

The method where the corresponding one or more people may include a particular person. The information associated with the corresponding one or more people may include one or more of: books, magazine articles, online posts, social network posts, blog posts, social media posts, digitized books, and/or transcribed videos of or by or including the corresponding one or more people.

The method where at least some results of the perspective search are based on a perspective of at least one particular person, as determined by the at least one of the one or more avatar mechanisms.

Implementations of the described techniques may include hardware, a method or process, or computer software on a computer-accessible medium.

One general aspect includes a computer-implemented method including (a) performing a search on a body of information based on a first perspective of a first particular person, where the first perspective is determined using a first avatar mechanism that was trained on a first corpus of information associated with the first particular person; and (b) providing at least some results of the search.

Implementations may include one or more of the following features, alone and/or in combination(s):

The method where the first perspective corresponds to a first perspective of the first particular person, as emulated by the first avatar mechanism.

The method where the search is a perspective search.

The method where the first corpus of information associated with the first particular person may include a first one or more of: books, magazine articles, online posts, social network posts, blog posts, social media posts, digitized books, and/or transcribed videos of or by or including the first particular person.

The method where the second perspective is emulated using a second avatar mechanism that was trained on a second corpus of information associated with the second particular person.

The method may include: (f) providing an indication of agreement between the first avatar mechanism and the second avatar mechanism.

Another general aspect includes a computer-implemented method including (a) training a first avatar mechanism on a corpus of information. The method may also include (b) performing a search on a body of information. The method may also include (c) providing results of the search based on the first avatar mechanism.

Implementations may include one or more of the following features, alone and/or in combination(s):

The method where the search may include a perspective search.

The method where the results of the search are based on a perspective of the first avatar mechanism.

The method where the providing in (c) may include filtering and/or sifting a set of search results based on the perspective of the first avatar mechanism.

The method where the corpus of information may include information associated with a first particular person.

The method where the results of the search are based on a perspective of the first particular person, as determined by the first avatar mechanism.

The method where a perspective of the first avatar mechanism emulates a particular perspective of the first particular person, as determined based on at least some of the information associated with the first particular person.

The method where the information associated with the first particular person may include one or more of: books, magazine articles, online posts, social network posts, blog posts, social media posts, digitized books, and/or transcribed videos of or by or including the first particular person.

The method where the method may include: (d) training a second avatar mechanism on a second corpus of information; and (e) using the second avatar mechanism to evaluate the results of the search.

The method where the using in (e) may include determining whether the second avatar mechanism agrees with the first avatar mechanism.

The method where the second corpus of information may include second information associated with a second particular person.

The method where at least some of the results of the search are provided in a user interface, and where agreement of the second avatar mechanism with the first avatar mechanism is indicated in the user interface.

Yet another general aspect includes a computer-implemented method including (a) providing a one or more avatar mechanisms, each the avatar mechanism having a corresponding perspective based on a corresponding corpus of information; (b) performing a perspective search on a body of information based on the corresponding perspective of at least one of the one or more avatar mechanisms, and (c) providing at least some results of the perspective search.

Implementations may include one or more of the following features, alone and/or in combination(s):

The method where the method includes: (d) evaluating a result of the perspective search in (b) based on a corresponding perspective of at least one other of the one or more avatar mechanisms.

The method where the method includes: (e) providing an indication of agreement between the at least some results and the at least one other of the one or more avatar mechanisms.

The method where the corresponding corpus of information for each avatar mechanism may include information associated with a corresponding particular person.

The method where the information associated with the corresponding particular person may include one or more of: books, magazine articles, online posts, social network posts, blog posts, social media posts, digitized books, and/or transcribed videos of or by or including the corresponding particular person.

The method where the at least some results of the perspective search are based on a perspective of at least one particular person, as determined by the at least one of the one or more avatar mechanisms.

Implementations of the described techniques may include hardware, a method or process, or computer software on a computer-accessible medium.

Other embodiments of each aspect may include corresponding computer systems, apparatus, and computer programs recorded on one or more computer storage devices, each configured to perform the actions of the methods.

Below is a list of method or process embodiments. Those will be indicated with a letter "P."

P1. A computer-implemented method comprising:
  (A) performing a search on a body of information based on a first perspective, wherein the first perspective is determined using a first corpus of information associated with a first particular set of people; and
  (B) providing at least some results of the search.

P2. The method of embodiment(s) P1, wherein the search comprises a perspective search.

P3. The method of any of the previous embodiment(s) P1-P2, wherein the first corpus of information associated with the first particular set of people comprises a first one or more of: books, magazine articles, online posts, social network posts, blog posts, social media posts, digitized books, and/or transcribed videos of or by or including the first particular set of people.

P4. The method of any of the previous embodiment(s) P1-P3, further comprising:
  (C) evaluating said at least some results of the search based on a second perspective, wherein the second perspective is based on a second corpus of information associated with a second particular set of people.

P5. The method of any of the previous embodiment(s) P1-P4, further comprising:
  (D) providing an indication of agreement between the first perspective and the second perspective.

P6. The method of any of the previous embodiment(s) P1-P5, wherein the first particular set of people comprises a first particular person.

P7. The method of any of the previous embodiment(s) P1-P6, wherein the second particular set of people comprises a second particular person.

P8. The method of any of the previous embodiment(s) P1-P7, wherein the first perspective was determined using a first avatar mechanism that was trained using the first corpus of information.

P9. The method of any of the previous embodiment(s) P1-P8, wherein the first perspective corresponds to a first perspective of the first particular person, as emulated a first avatar mechanism that was trained using the first corpus of information.

P10. The method of any of the previous embodiment(s) P1-P9, wherein the second perspective was determined using a second avatar mechanism that was trained using the second corpus of information.

P11. A computer-implemented method comprising:
performing a search on a body of information; and
providing results of the search based on a first avatar mechanism that was trained using a first corpus of information.

P12. The method of embodiment(s) P11, further comprising:
training the first avatar mechanism using the first corpus of information.

P13. The method of any of the previous embodiment(s) P11-P12, wherein the search comprises a perspective search.

P14. The method of any of the previous embodiment(s) P11-P13, wherein the results of the search are based on a perspective of the first avatar mechanism.

P15. The method of any of the previous embodiment(s) P11-P14, wherein the first corpus of information comprises information associated with a first set of one or more people.

P16. The method of any of the previous embodiment(s) P11-P15, wherein the first set of one or more people comprises a first particular person.

P17. The method of any of the previous embodiment(s) P11-P16, wherein the results of the search are based on a perspective of the first particular person, as determined by the first avatar mechanism.

P18. The method of any of the previous embodiment(s) P11-P17, wherein a perspective of the first avatar mechanism emulates a particular perspective of the first particular person, and wherein the first corpus of information comprises at least some information associated with the first particular person.

P19. The method of any of the previous embodiment(s) P11-P18, wherein the information associated with the first particular person comprises one or more of: books, magazine articles, online posts, social network posts, blog posts, social media posts, digitized books, and/or transcribed videos of or by or including the first particular person.

P20. The method of any of the previous embodiment(s) P11-P19, wherein the providing comprises filtering and/or sifting a set of search results based on the perspective of the first avatar mechanism.

P21. The method of any of the previous embodiment(s) P11-P20, further comprising using a second avatar mechanism to evaluate the results of the search, wherein the second avatar mechanism was trained using a second corpus of information.

P22. The method of any of the previous embodiment(s) P11-P21, wherein the using comprises determining whether the second avatar mechanism agrees with the first avatar mechanism.

P23. The method of any of the previous embodiment(s) P11-P22, wherein the second corpus of information comprises second information associated with a second set of one or more people.

P24. The method of any of the previous embodiment(s) P11-P23, wherein the second set of one or more people comprises a second particular person.

P25. The method of any of the previous embodiment(s) P11-P24, wherein at least some of the results of the search are provided in a user interface, and wherein agreement of the second avatar mechanism with the first avatar mechanism is indicated in the user interface.

P26. A computer-implemented method comprising:
(A) performing a perspective search on a body of information based on a corresponding perspective of at least one of one or more avatar mechanisms, wherein each of the one or more avatar mechanisms has a corresponding perspective based on a corresponding corpus of information; and
(B) providing at least some results of the perspective search.

P27. The method of embodiment(s) P26, wherein each of the one or more avatar mechanisms was trained using the corresponding corpus of information.

P28. The method of any of the previous embodiment(s) P26-P27, further comprising training the one or more avatar mechanisms.

P29. The method of any of the previous embodiment(s) P26-P28, further comprising evaluating a result of the perspective search based on a corresponding perspective of at least one other of the one or more avatar mechanisms.

P30. The method of any of the previous embodiment(s) P26-P29, further comprising providing an indication of agreement between the at least some results and the at least one other of the one or more avatar mechanisms.

P31. The method of any of the previous embodiment(s) P26-P30, wherein the corresponding corpus of information for each avatar mechanism comprises information associated with a corresponding one or more people.

P32. The method of any of the previous embodiment(s) P26-P31, wherein the corresponding one or more people comprise a particular person.

P33. The method of any of the previous embodiment(s) P26-P32, wherein the information associated with the corresponding one or more people comprises one or more of: books, magazine articles, online posts, social network posts, blog posts, social media posts, digitized books, and/or transcribed videos of or by or including the corresponding one or more people.

P34. The method of any of the previous embodiment(s) P26-P33, wherein the at least some results of the perspective search are based on a perspective of at least one particular person, as determined by the at least one of the one or more avatar mechanisms.

P35. A computer-implemented method comprising:
(A) performing a search on a body of information based on a first perspective of a first particular person, wherein the first perspective is determined using a first avatar mechanism that was trained on a first corpus of information associated with the first particular person; and
(B) providing at least some results of the search.

P36. The method of embodiment(s) P35, wherein the first perspective corresponds to a first perspective of the first particular person, as emulated by the first avatar mechanism.

P37. The method of any of the previous embodiment(s) P35-P36, wherein the search is a perspective search.

P38. The method of any of the previous embodiment(s) P35-P37, wherein the first corpus of information associated with the first particular person comprises a first one or more of: books, magazine articles, online posts, social network posts, blog posts, social media posts, digitized books, and/or transcribed videos of or by or including the first particular person.

P39. The method of any of the previous embodiment(s) P35-P38, further comprising: (E) evaluating the at least some results of the search based on a second perspective of a second particular person, wherein the second perspective is emulated using a second avatar mechanism that was trained on a second corpus of information associated with the second particular person.

P40. The method of any of the previous embodiment(s) P35-P39, further comprising: (F) providing an indication of agreement between the first avatar mechanism and the second avatar mechanism.

P41. A computer-implemented method comprising:
(A) training a first avatar mechanism on a corpus of information;
(B) performing a search on a body of information; and
(C) providing results of the search based on the first avatar mechanism.

P42. The method of embodiment(s) P41, wherein the search comprises a perspective search.

P43. The method of any of the previous embodiment(s) P41-P42, wherein the results of the search are based on a perspective of the first avatar mechanism.

P44. The method of any of the previous embodiment(s) P41-P43, wherein the corpus of information comprises information associated with a first particular person.

P45. The method of any of the previous embodiment(s) P41-P44, wherein the results of the search are based on a perspective of the first particular person, as determined by the first avatar mechanism.

P46. The method of any of the previous embodiment(s) P41-P45, wherein a perspective of the first avatar mechanism emulates a particular perspective of the first particular person, as determined based on at least some of the information associated with the first particular person.

P47. The method of any of the previous embodiment(s) P41-P46, wherein the information associated with the first particular person comprises one or more of: books, magazine articles, online posts, social network posts, blog posts, social media posts, digitized books, and/or transcribed videos of or by or including the first particular person.

P48. The method of any of the previous embodiment(s) P41-P47, wherein the providing in (C) comprises filtering and/or sifting a set of search results based on the perspective of the first avatar mechanism.

P49. The method of any of the previous embodiment(s) P41-P48, further comprising:
(D) training a second avatar mechanism on a second corpus of information; and
(E) using the second avatar mechanism to evaluate the results of the search.

P50. The method of any of the previous embodiment(s) P41-P49, wherein the using in (E) comprises determining whether the second avatar mechanism agrees with the first avatar mechanism.

P51. The method of any of the previous embodiment(s) P41-P50, wherein the second corpus of information comprises second information associated with a second particular person.

P52. The method of any of the previous embodiment(s) P41-P51, wherein at least some of the results of the search are provided in a user interface, and wherein agreement of the second avatar mechanism with the first avatar mechanism is indicated in the user interface.

P53. A computer-implemented method comprising:
(A) providing a one or more avatar mechanisms, each the avatar mechanism having a corresponding perspective based on a corresponding corpus of information;
(B) performing a perspective search on a body of information based on the corresponding perspective of at least one of the one or more avatar mechanisms; and
(C) providing at least some results of the perspective search.

P54. The method of embodiment(s) P53, further comprising: (D) evaluating a result of the perspective search in (B) based on a corresponding perspective of at least one other of the one or more avatar mechanisms.

P55. The method of any of the previous embodiment(s) P53-P54, further comprising: (E) providing an indication of agreement between the at least some results and the at least one other of the one or more avatar mechanisms.

P56. The method of any of the previous embodiment(s) P53-P55, wherein the corresponding corpus of information for each avatar mechanism comprises information associated with a corresponding particular person.

P57. The method of any of the previous embodiment(s) P53-P56, wherein the information associated with the corresponding particular person comprises one or more of: books, magazine articles, online posts, social network posts, blog posts, social media posts, digitized books, and/or transcribed videos of or by or including the corresponding particular person.

P58. The method of any of the previous embodiment(s) P53-P57, wherein the at least some results of the perspective search are based on a perspective of at least one particular person, as determined by the at least one of the one or more avatar mechanisms.

Below is a list of article of manufacture embodiments. Those will be indicated with a letter "A."

A59. An article of manufacture comprising non-transitory computer-readable media having computer-readable instructions stored thereon, the computer readable instructions including instructions for implementing a computer-implemented method, the method operable on a device comprising hardware including memory and at least one processor and running a service on the hardware, the method comprising the method of any one of the preceding method aspects or embodiments P1-P58.

Below is a list of device embodiments. Those will be indicated with a letter "D."

D60. A device, comprising:
(a) hardware including memory and at least one processor, and
(b) a service running on the hardware, wherein the service is configured to: perform the method of any one of the preceding method aspects or embodiments P1-P58.

Below is a list of system embodiments. Those will be indicated with a letter "S."

S61. A system comprising at least one device according to device embodiment(s) D60.

The above features along with additional details of the invention are described further in the examples herein, which are intended to further illustrate the invention but are not intended to limit its scope in any way.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

FIG. 3A-3B show screenshots of aspects of an exemplary implementation of a framework according to embodiments hereof;

FIGS. 4A-4G are flowcharts showing aspects of operation of a framework according to exemplary embodiments hereof.

DETAILED DESCRIPTION OF THE PRESENTLY PREFERRED EXEMPLARY EMBODIMENTS

As used herein, the term "mechanism," as used herein, refers to any device(s), process(es), service(s), or combination thereof. A mechanism may be implemented in hardware, software, firmware, using a special-purpose device, or any combination thereof. A mechanism may be integrated into a single device, or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Overview and Structure

Figure 1:
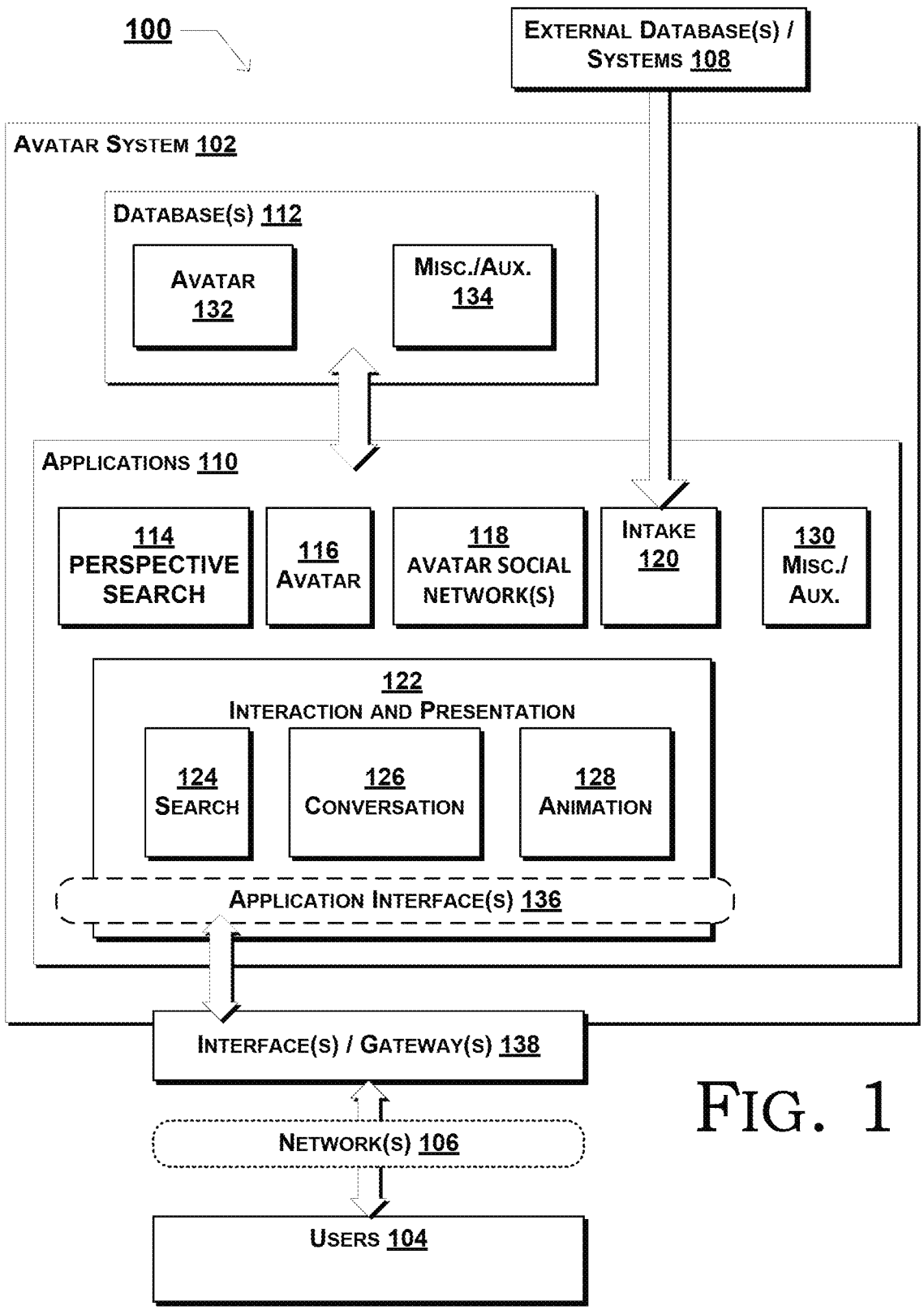
FIG. 1 shows an overview of aspects of a framework according to exemplary embodiments hereof.

FIG. 1 shows aspects of an exemplary framework/system 100 for an avatar system 102 according to exemplary embodiments hereof. As shown in the drawing, an avatar system 102 may be accessed by users 104, e.g., via one or more networks 106 (e.g., the Internet).

The users 104 may have distinct roles and may be provided with role-specific access interfaces and/or mechanisms.

Each user 104 may access the avatar system 102 using one or more computing devices, as is known in the art. The avatar system 102 may also access and be accessible by various external systems and/or databases 108. These external systems and/or databases 108 may include social media sites such as Twitter, Facebook, Email, and blogs, stock and/or commodity price databases, published articles, books, magazines, etc.

As shown in FIG. 1, the avatar system 102 (sometimes referred to as the "backend" or "backend platform") may comprise various mechanisms or applications 110 (e.g., in the form of software applications) and one or more databases 112, described in greater detail below. The mechanisms/applications 110 may generally interact with the one or more databases 112.

The database(s) 112 may be or comprise multiple separate or integrated databases, at least some of which may be distributed. The database(s) 112 may be implemented in any manner, and, when made up of more than one database, the various databases need not all be implemented in the same manner. It should be appreciated that the system is not limited by the nature or location of database(s) 112 or by the manner in which they are implemented.

Each of the applications 110 is essentially a mechanism (as defined above, e.g., a software application) that may provide one or more services via an appropriate interface. Although shown as separate mechanisms for the sake of this description, it should be appreciated that some or all of the various mechanisms/applications 110 may be combined. The various mechanisms/applications 110 may be implemented in any manner and need not all be implemented in the same manner (e.g., with the same languages or interfaces or protocols).

The applications 110 may include one or more of the following mechanisms:
1. perspective search mechanism(s) 114
2. avatar mechanism(s) 116
3. avatar social network mechanism(s) 118
4. intake mechanism(s) 120
5. Interaction and presentation mechanism(s) 122
6. search mechanism(s) 124
7. conversation mechanism(s) 126
8. animation mechanism(s) 128
9. Miscellaneous/auxiliary mechanisms 130

Note that the above list of mechanisms/mechanisms is exemplary and is not intended to limit the scope of the system 100 in any way. Those of ordinary skill in the art will appreciate and understand, upon reading this description, that the system 100 may include any other types of data processing mechanisms, image recognition mechanisms, and/or other types of mechanisms that may be necessary for the system 100 to generally perform its functionalities as described herein. In addition, as should be appreciated, embodiments or implementations of the system 100 need not include all of the mechanisms listed, and that some or all of the mechanisms may be optional.

The database(s) 112 may include one or more of the following database(s):
1. Avatar database(s) 132
2. Miscellaneous and auxiliary database(s) 134

The above list of databases is exemplary and is not intended to limit the scope of the system 100 in any way.

As shown in FIG. 1, the avatar system 102 may access one or more external systems and/or databases 108. This access may include access via intake mechanism(s) 120 which may access external systems in order to obtain data therefrom. The miscellaneous/auxiliary mechanisms 130 may evaluate data (e.g., obtained from external systems and/or databases 108 and/or in the database(s) 112) in order to determine information therefrom.

Various mechanisms in the avatar system 102 may be accessible via application interface(s) 136. These application interfaces 136 may be provided in the form of APIs (application programming interfaces) or the like, made accessible to external users 104 via one or more gateways and interfaces 138. For example, the avatar mechanism(s) 116 may provide APIs thereto (via application interface(s) 136), and the system 102 may provide external access to aspects of the presentation mechanism(s) 122 (to users 104) via appropriate gateways and interfaces 138 (e.g., via a web-based mechanism and/or a mechanism running on a user's device).

Mechanisms and Data Structures

Details of various mechanisms, applications, processes and functionalities of an exemplary avatar system 102 are now described.

Perspective Search

Figure 2A:
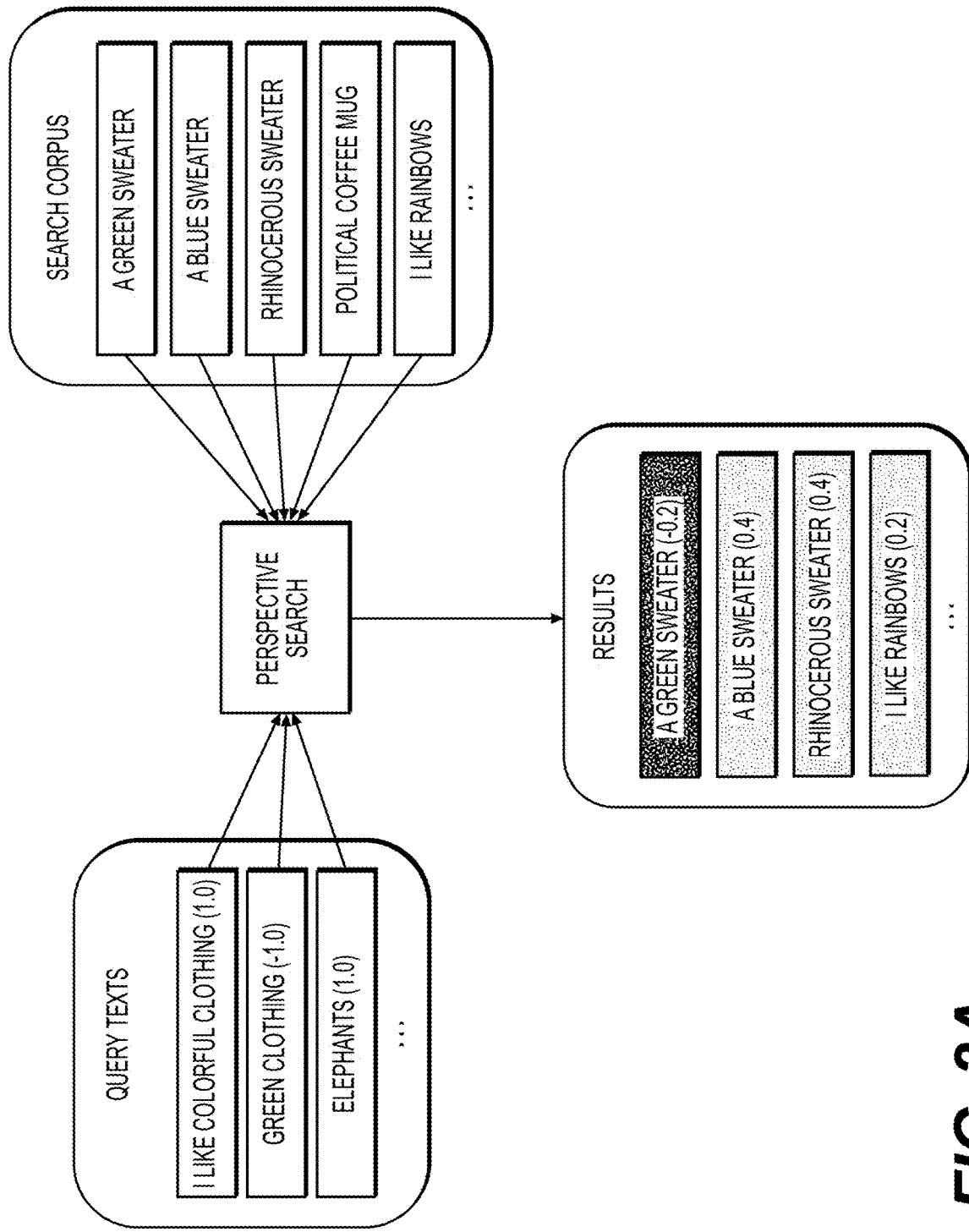
FIG. 2A shows an example of a perspective search according to exemplary embodiments hereof.

In many situations, it is useful to be able to search through textual documents given a perspective defined by a weighted collection of natural language statements. A goal of this approach is to search semantically (based on the meaning of a query, not on its phrasing) utilizing meaning-information from all query texts to determine the extent to which each element of a search corpus is similar to and agrees or disagrees with the aggregate query texts. An example of this approach is shown in FIG. 2A.

Aspects of an exemplary perspective search mechanism 114 (implementing a perspective search algorithm) include one or more of:

The mechanism takes as inputs all query texts and the entire search corpus

The mechanism outputs a score for each element of the search corpus, or for some subset of the search corpus (for efficiency). This score may reflect the extent to which an element in the search corpus agrees with the aggregate meaning of the query texts.

The score function for each element of the search corpus is likely non-linear and considers all (or some subset) of the provided query texts.

Various score functions may be used, alone or in combination, and, as should be appreciated, different score functions provide different results or degrees of accuracy.

Some exemplary score functions are listed here:

the score function may be the sum of the Jaccard distance between each search corpus text and all query texts, although this would be a non-semantic metric.

the score function may be the average cosine similarity between neural-network-generated text embeddings of all query texts and neural-network-generated text embeddings for each element of the search corpus.

the score function may be the sum of the square of the distance of neural-network-generated text embeddings of all query texts and neural-network-generated text embeddings for each element of the search corpus.

the score may be the direct output of a neural network which takes as input (or considers during its training) all query texts and also takes as input one or more search corpus texts, then outputs a score or multiple scores representing the extent to which the meaning of the search text agrees with the aggregate meaning of the query texts.

Example Perspective Search Algorithm

An example perspective search algorithm, implemented, e.g., in a perspective search mechanism 114, is described here. Those of skill in the art will understand, upon reading this description, that different and/or other perspective search algorithms may be used.

Producing scores for all search texts and all query texts for a search corpus scales at best like $O(m*n*d)$ where m is the number of query texts, n is the number of search texts, and d is the size (dimension) of the embedding vectors. As can thus be appreciated, for a large search corpus, utilizing a brute force approach to calculate a score for all search texts and given all query texts may be infeasible due to computational limitations.

Accordingly, the system may use a far more efficient approach than a brute force methodology for performing a perspective search with a large corpus of search texts.

In some embodiments, this exemplary algorithm performs k-Nearest-Neighbor queries operating on an efficient data structure for each query text, relying on overlapping k-Nearest-Neighbor search results across multiple query texts to identify the results being searched for. In practice, this algorithm provides a very good approximation of the non-optimized approach when common non-linear scoring functions are utilized.

Figure 4B:
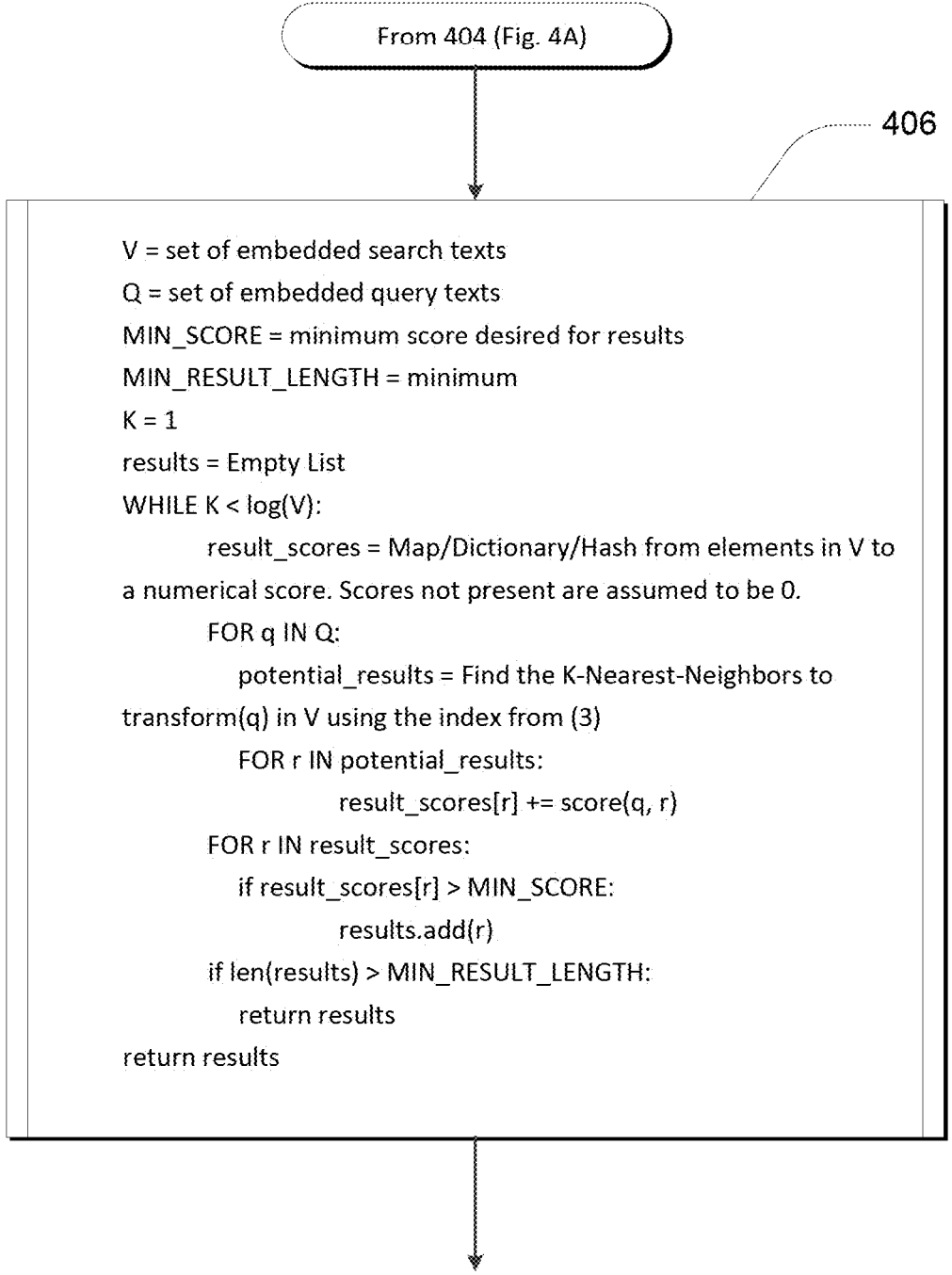

To further refine results, one or more transformations may be applied to each embedded query-text-vector before performing the k-Nearest-Neighbor search. These transformation(s) may include:

Masking (setting to 0 or reducing in magnitude) components in a vector determined to be irrelevant to this particular search, or increase the quality of this particular search Increasing the magnitude of certain components in this vector determined to be particularly relevant to, or likely increase the quality of, this particular search An exemplary perspective algorithm may include the following (with reference to the flowchart in FIGS. 4A-4B):

(1) Transform all query texts and search texts into high-dimensional vectors using a text-embedding method (e.g., Glove, Word2Vec, Transformer-based language model embeddings, etc.) (at 402)

(2) Index all search texts using a similarity-search data structure for high-dimensional vectors, such as (e.g., Locality Sensitive Hash Table, Hierarchical Navigable Small World graph exploration, etc.) (at 404) that preferably has the property of providing k-Nearest-Neighbor search in at most $O(\log(n))$ time.

(3) Run the following algorithm (at 406, FIGS. 4A-4B):

```
V = set of embedded search texts
Q = set of embedded query texts
MIN_SCORE = minimum score desired for results
MIN_RESULT_LENGTH = minimum
K = 1
results = Empty List
WHILE K < log(V):
    result_scores = Map/Dictionary/Hash from elements in V to a
numerical score. Scores not present are assumed to be 0.
    FOR q IN Q:
        potential_results = Find the K-Nearest-Neighbors to
    transform(q) in V using the index from (3)
        FOR r IN potential_results:
            result_scores[r] += score(q, r)
        FOR r IN result_scores:
            if result_scores[r] > MIN_SCORE:
                results.add(r)
        if len(results) > MIN_RESULT_LENGTH:
            return results
return results
```

This algorithm's runtime scales according to $O(|Q|*\log(|V|)*\log(|V|)*d)$ which is clearly better than the $O(m*n*d)$ of the brute force approach.

Avatar Mechanisms

Based on the textual digital footprints of individuals (e.g., from blog posts, social media posts, digitized books, transcribed videos, etc.), the perspective search mechanism 114 (e.g., as above) may be used to treat the digital footprint of a given person as an "Avatar" and it may be used to search through a corpus of textual data (e.g., data obtained from external systems and/or databases 108). The score for each result may reflect, in this case, the extent to which the given person might agree, and be interested in, a given statement.

An avatar mechanism 116 (also referred to as an avatar) may be constructed via any combination of textual data of interest. For instance, all content from particular website(s), or from particular book(s), or from multiple different peoples' digital footprints, may be used.

Figure 2B:
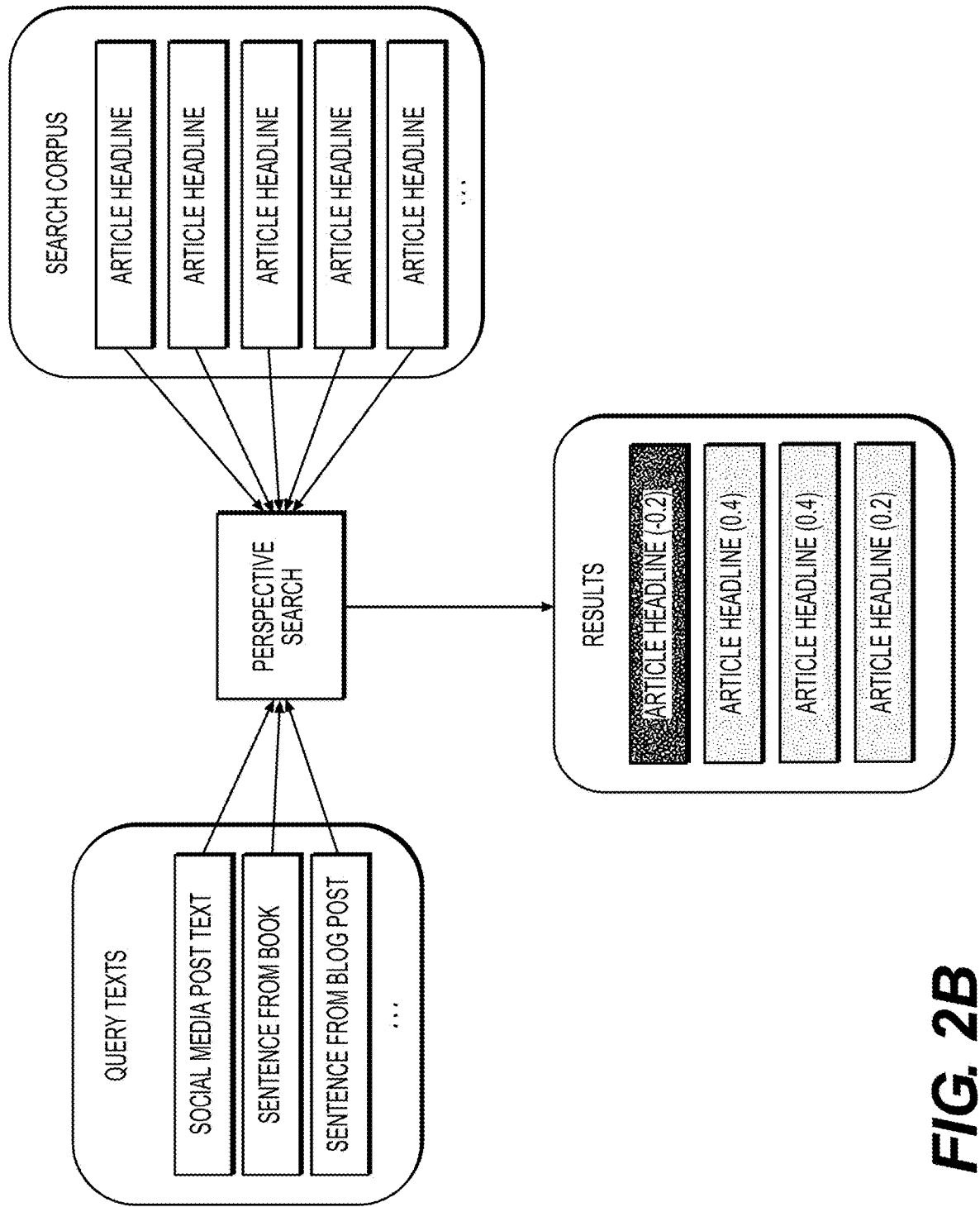
FIG. 2B shows aspects of using a person's digital footprint to inform a search.

As an example, with reference to FIG. 2B, a certain person's digital footprint may be used to form an avatar mechanism that may be used to evaluate the likelihood that that person would be interested in reading or sharing a given news article, based, e.g., upon its headline and/or contents.

With reference again to FIG. 1, an avatar for a particular person may be constructed by the avatar mechanism 116 using data obtained from one or more external systems and/or databases 108. Information about the person's avatar mechanism may be stored and maintained in the avatar database(s) 132.

Avatar Social Networks

Digital avatars or avatar mechanisms for multiple people may interact with one another, and optionally with users, to perform actions typical in a social network. This approach is based, in part, on an understanding that the digital footprint of any person may be used to determine the extent to which they would read and/or share a given piece of content.

In some cases, this process may work as follows:

Avatar mechanisms (or avatars) "select" or "post" content based on a score provided by a perspective search based upon content presented and on the Avatar's digital footprint. This selection may be a score threshold (selecting all content with a score greater than some number), or may be selecting the top K (e.g., 3) pieces of content.

Content from the previous step may be input into a perspective search for other avatar mechanisms using their respective digital footprints. If the score output is above a certain (lower) threshold, the system may record that the second avatar "Likes" this content.

The final selection of content, and the "likes" associated therewith, may be presented to an end user. Preferably it is made clear which person's avatar (i.e., which avatar mechanism(s)) selected which piece of content, and which people's avatar mechanisms have liked each piece of content.

Conversational Avatars

An algorithm may use language-model text generation and the perspective-search methodology, to respond to user input based upon a given prompt, much as the real person might do. Those of skill in the art will understand, upon reading this description, that using perspective search as an avatar mechanism's "Memory", allows the system to bypass a primary issue with language-model text generation: typically, the generated text does not embody precise facts or knowledge.

Aspects of this approach may include:

1. Fine-Tune a Language Model on a user's Digital Footprint (optional). Training a pre-existing language model (a machine learning model that predicts the next token in a sequence) that has been trained on a large corpus, to produce the text present in the user's digital footprint. This step is optional, since language models may not need fine-tuning to contextually infer the linguistic style and knowledge of an individual given the perspective search results (see (2)) alone.
2. Memory: Search through a person's digital footprint using Perspective Search for content that matches (A) the user-provided prompt, and (B) the previous conversational context between the avatar mechanism and the user (optionally with a discounted weight applied), if applicable.
3. Generation: By feeding (A) the user provided prompt, (B) the previous conversational context, and (C) the collection of statements most relevant from a person's digital footprint into this language model, the system may produce text much like the real person might. This information may be fed into the language model in numerous ways:
   a) As special input to any underlying part of the language model, separate from the provided prompt (e.g., as numerical input to some layer(s) of the original language model's neural network)
   b) As combined plain text, such as:
   [Formatted Perspective Search Results]
   Hal: My name is Hal
   Hal: I am an artificial intelligence
   [Conversational Context]
   User: Hello, Hal
   Hal: Hello.
   [Prompt]
   User: What is your name?
   Hal:
4. The final generated text can be presented to a user, and the user can then provide an additional response in return.

This process may also be used to allow the avatars to produce commentary, in general, for any textual input. For example, by replacing the Prompt in the above process with the contents of a news article, the language model may produce commentary about the article using knowledge from the Avatar's source digital footprint.

Figure 2C:
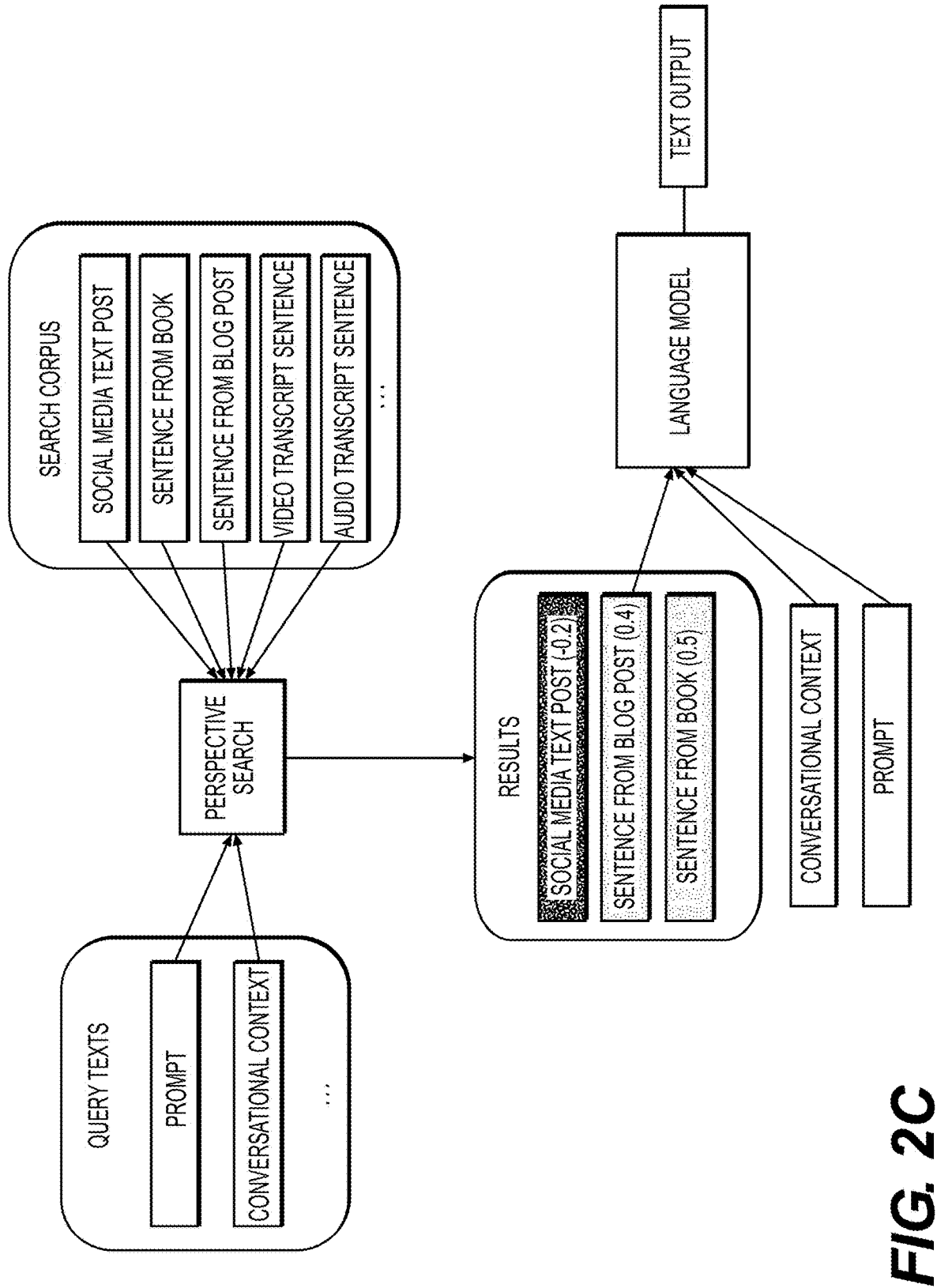
FIG. 2C shows aspects of an architecture according to exemplary embodiments hereof.

FIG. 2C show an exemplary overall architecture for this system.

EXEMPLARY OPERATION

An overview of exemplary operation of a framework/system 100 is described here with reference to the screenshots in FIGS. 3A-3B and the flowcharts in FIG. 4C-4G.

Example 1.1

Figure 4C:
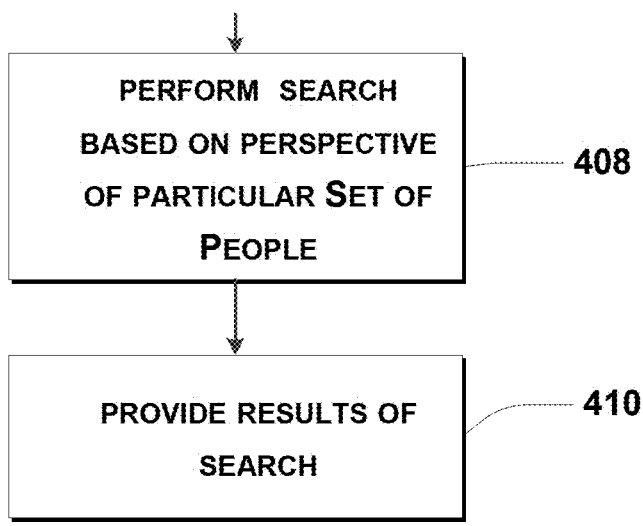

In one example implementation, with reference to the flowchart in FIG. 4C, a search is performed (at 408) on a body of information based on a first perspective, where the first perspective is determined using a first corpus of information associated with a first particular set of people. Then results of the search are provided (at 410).

The search may be a perspective search.

The corpus of information associated with the first particular set of people may include a first one or more of: books, magazine articles, online posts, social network posts, blog posts, social media posts, digitized books, and/or transcribed videos of or by or including the first particular set of people.

Example 1.2

The example implementation of Example 1.1, further includes evaluating at least some results of the search based on a second perspective, wherein the second perspective is based on a second corpus of information associated with a second particular set of people.

Example 1.3

The example implementation of Example 1.2, further includes providing an indication of agreement between the first perspective and the second perspective.

Example 1.4

The example implementation of Examples 1.1 to 1.3, further includes wherein the first perspective was determined using a first avatar mechanism that was trained using the first corpus of information.

The first perspective may correspond to a first perspective of the first particular person, as emulated a first avatar mechanism that was trained using the first corpus of information.

Example 1.5

The example implementation of Examples 1.1 to 1.4, where the second perspective was determined using a second avatar mechanism that was trained using the second corpus of information.

Example 2.1

Figure 4D:
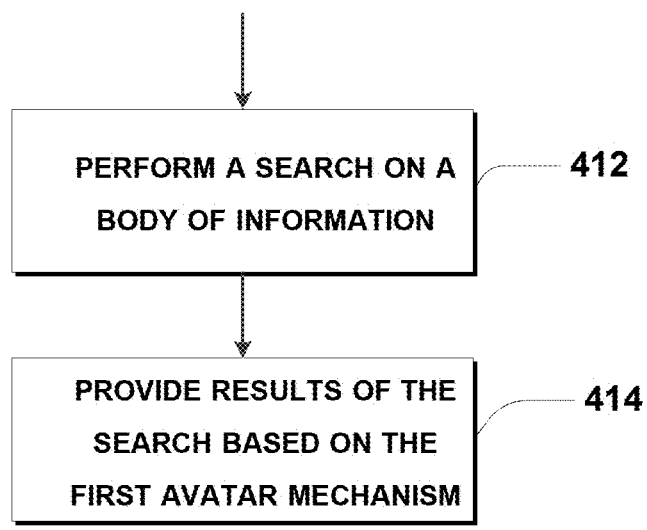

In another example implementation, with reference to the flowchart in FIG. 4D, a search is performed (at 412) on a body of information; and results of the search are provided (at 414), based on the first avatar mechanism that was trained using a first corpus of information.

The search is preferably a perspective search. The results of the search are preferably based on a perspective of the first avatar mechanism.

The corpus of information comprises information associated with a first set of one or more people, and the results of the search are based on a perspective of the first set of one or more people, as determined by the first avatar mechanism.

In some implementations the information associated with the first set of one or more people comprises one or more of: books, magazine articles, online posts, social network posts, blog posts, social media posts, digitized books, and/or transcribed videos of or by or including the first set of one or more people.

In some implementations, the providing (at 414) includes filtering and/or sifting a set of search results based on the perspective of the first avatar mechanism.

Example 2.2

The example implementation of Example 2.1, further includes using a second avatar mechanism to evaluate the results of the search, wherein the second avatar mechanism was trained using a second corpus of information.

The implementation may determine whether the second avatar mechanism agrees with the first avatar mechanism.

The second corpus of information may include second information associated with a second set of one or more people.

Example 2.3

The example implementation of Example 2.2, further includes providing at least some of the results of the search in a user interface, and indicating agreement of the second avatar mechanism with the first avatar mechanism in the user interface.

Example 3.1

Figure 4E:
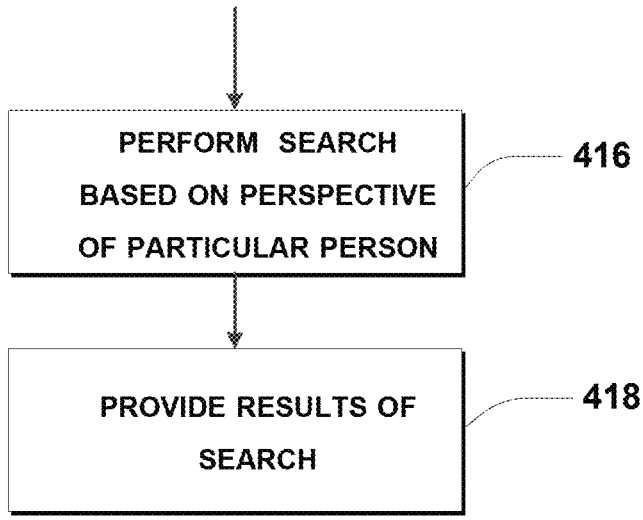

In one example implementation, with reference to the flowchart in FIG. 4E, a search is performed (at 416) on a body of information based on a first perspective of a first particular person. The first perspective is determined using a first avatar mechanism that was trained on a first corpus of information associated with the first particular person. Then results of the search are provided (at 418).

The first perspective corresponds to a first perspective of the first particular person, as emulated by the first avatar mechanism.

The search is preferably a perspective search.

The first corpus of information associated with the first particular person comprises a first one or more of: books, magazine articles, online posts, social network posts, blog posts, social media posts, digitized books, and/or transcribed videos of or by or including the first particular person.

Example 3.2

The example implementation of Example 3.1, further includes evaluating the at least some results of the search based on a second perspective of a second particular person, wherein the second perspective is emulated using a second avatar mechanism that was trained on a second corpus of information associated with the second particular person.

Example 3.3

The example implementation of Example 3.2, further includes providing an indication of agreement between the first avatar mechanism and the second avatar mechanism. The indication of agreement may, e.g., be a "thumbs up" image or the like.

Example 4.1

Figure 4F:
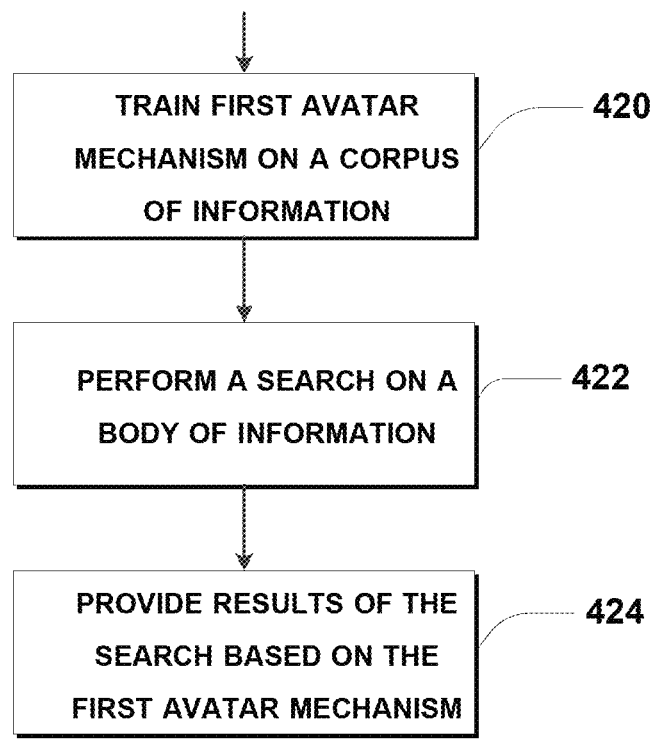

In another example implementation, with reference to the flowchart in FIG. 4F, a first avatar mechanism is trained on a corpus of information (at 420). Then a search is performed (at 422) on a body of information; and results of the search are provided (at 424), based on the first avatar mechanism.

The search is preferably a perspective search.

The results of the search are preferably based on a perspective of the first avatar mechanism.

The corpus of information comprises information associated with a first particular person, and the results of the search are based on a perspective of the first particular person, as determined by the first avatar mechanism.

In some implementations a perspective of the first avatar mechanism emulates a particular perspective of the first particular person, as determined based on at least some of the information associated with the first particular person.

In some implementations the information associated with the first particular person comprises one or more of: books, magazine articles, online posts, social network posts, blog posts, social media posts, digitized books, and/or transcribed videos of or by or including the first particular person.

In some implementations, the providing (at 424) includes filtering and/or sifting a set of search results based on the perspective of the first avatar mechanism.

Example 4.2

The example implementation of Example 4.1, further includes training a second avatar mechanism on a second corpus of information; and using the second avatar mechanism to evaluate the results of the search.

The implementation may determine whether the second avatar mechanism agrees with the first avatar mechanism.

The second corpus of information may include second information associated with a second particular person.

In some exemplary implementations, at least some of the results of the search are provided in a user interface, and agreement of the second avatar mechanism with the first avatar mechanism is indicated in the user interface.

Example 5.1

In another example implementation, with reference to the flowchart in FIG. 4G, one or more avatar mechanisms are provided (at 426), each having a corresponding perspective based on a corresponding corpus of information. A perspective search is performed (at 428) on a body of information based on the corresponding perspective of at least one of the avatar mechanisms. Some results of the perspective search are provided (at 430).

Example 5.2

The example implementation of Example 5.1, further includes evaluating (at 432) a result of the perspective search based on a corresponding perspective of at least one other of the one or more avatar mechanisms.

In some implementations, the method includes providing an indication of agreement between the avatar mechanisms on the search results.

The corpus of information used for each avatar mechanism comprises information associated with a corresponding particular person and may include one or more of: books, magazine articles, online posts, social network posts, blog posts, social media posts, digitized books, and/or transcribed videos of or by or including the corresponding particular person.

Example Implementations

In an example implementation, the framework 100 was used to form avatar mechanisms for Peter Diamandis and Ray Kurzweil. Each avatar mechanism was formed using a corpus of data from their respective writings (including, e.g., books, blog postings, social network postings, etc.).

These avatar mechanisms were used to review certain news articles. As shown in the screenshot in FIG. 3A, the Diamandis avatar (referred to in the diagram as "Virtual Diamandis") selected a particular news article and the Kurzweil avatar mechanism (referred to in the diagram as "Virtual Kurzweil") liked that article.

Similarly, as shown in the screenshot in FIG. 3B, the Virtual Kurzweil selected a particular news article and the Virtual Diamandis liked that article.

Computing

The services, mechanisms, operations, and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 5:
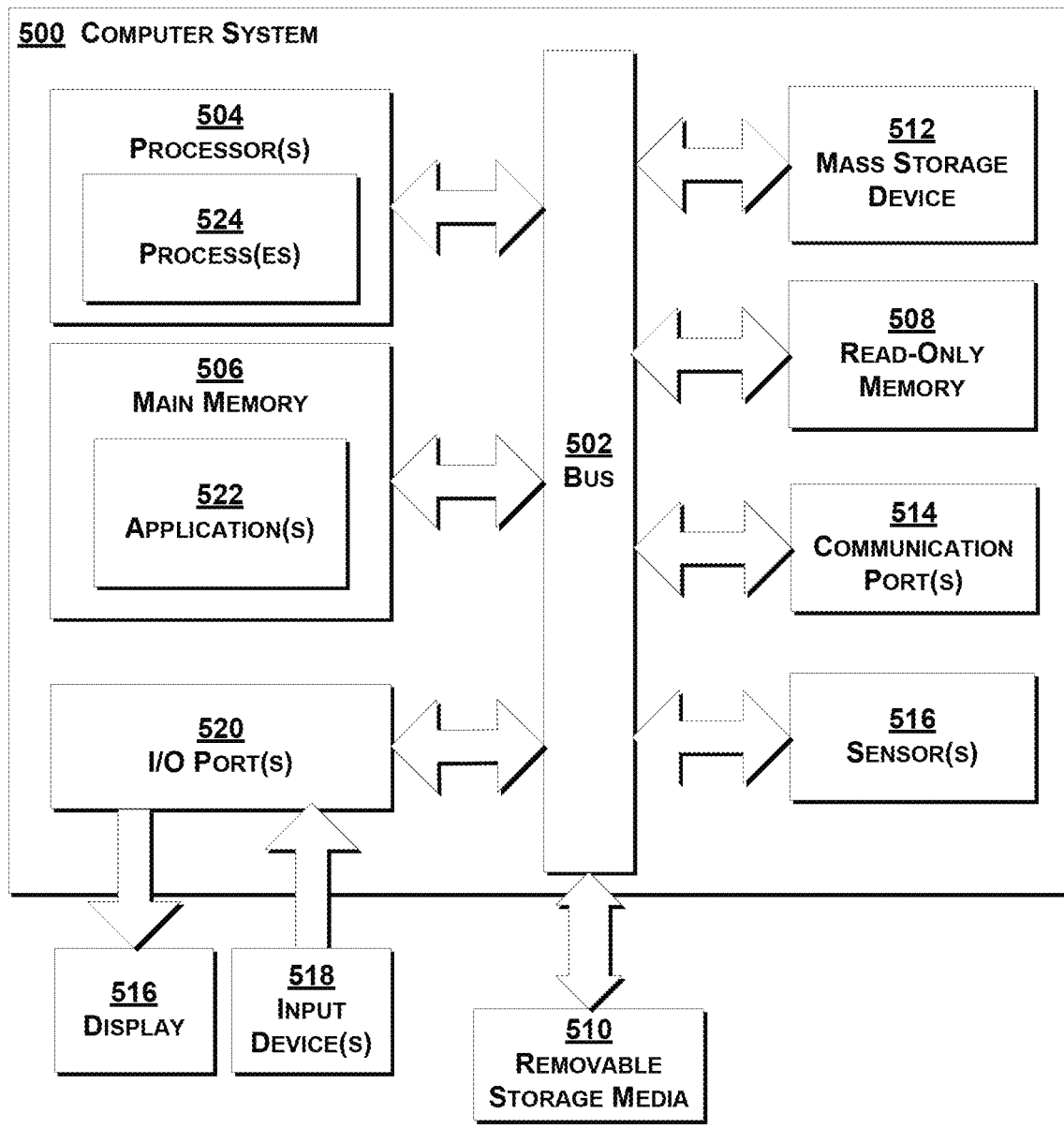
FIG. 5 depicts aspects of computing and computer devices in accordance with exemplary embodiments hereof.

FIG. 5 is a schematic diagram of a computer system 500 upon which embodiments of the present disclosure may be implemented and carried out.

According to the present example, the computer system 500 includes a bus 502 (i.e., interconnect), one or more processors 504, a main memory 506, read-only memory (ROM) 508, removable storage media 510, and mass storage 512, and one or more communications ports 514. Communication port(s) 514 may be connected to one or more networks (not shown) whereby the computer system 500 may receive and/or transmit data.

As used herein, a "processor" means one or more microprocessors, central processing units (CPUs), graphics processing units (GPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 504 can be (or include) any known processor, such as, but not limited to, an Intel® Itanium® or Itanium 2® processor(s), AMD® Opteron® or Athlon MP® processor(s), or Motorola® lines of processors, and the like.

Communications port(s) 514 can be any of an RS-232 port for use with a modem-based dial-up connection, a 10/100 Ethernet port, a Gigabit port using copper or fiber, or a USB port, and the like. Communications port(s) 514 may be chosen depending on a network such as a Local Area Network (LAN), a Wide Area Network (WAN), a CDN, or any network to which the computer system 500 connects. The computer system 500 may be in communication with peripheral devices (e.g., display screen 516, input device(s) 518) via Input/Output (I/O) port 520. Some or all of the peripheral devices may be integrated into the computer system 500, and the input device(s) 518 may be integrated into the display screen 516 (e.g., in the case of a touch screen).

Main memory 506 may be Random Access Memory (RAM), or any other dynamic storage device(s) commonly known in the art. Read-only memory 508 can be any static storage device(s) such as Programmable Read-Only Memory (PROM) chips for storing static information such as instructions for processor(s) 504. Mass storage 512 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage and communications blocks. Bus 502 can be a PCI/PCI-X, SCSI, a Universal Serial Bus (USB) based system bus (or other) depending on the storage devices used, and the like. Removable storage media 510 can be any kind of external hard-drives, floppy drives, IOMEGA® Zip Drives, Compact Disc—Read Only Memory (CD-ROM), Compact Disc—Re-Writable (CD-RW), Digital Versatile Disk—Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory, which typically constitutes the main memory of the computer. Transmission media include coaxial cables, copper wire and fiber optics, including the wires that comprise a system bus coupled to the processor. Transmission media may include or convey acoustic waves, light waves, and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards, or protocols; and/or (iv) encrypted in any of a variety of ways well known in the art.

A computer-readable medium can store (in any appropriate format) those program elements that are appropriate to perform the methods.

As shown, main memory 506 is encoded with applications(s) 522 that support(s) the functionality as discussed herein (an application 522 may be a mechanism that provides some or all of the functionality of one or more of the mechanisms described herein). Application(s) 522 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 506 via the use of bus 502 in order to launch, run, execute, interpret, or otherwise perform the logic instructions of the application(s) 522. Execution of application(s) 522 produces processing functionality of the service(s) or mechanism(s) related to the application(s). In other words, the process(es) 524 represents one or more portions of the application(s) 522 performing within or upon the processor(s) 504 in the computer system 500.

It should be noted that, in addition to the process(es) 524 that carries(carry) out operations as discussed herein, other embodiments herein include the application 522 itself (i.e., the un-executed or non-performing logic instructions and/or data). The application 522 may be stored on a computer readable medium (e.g., a repository) such as a disk or in an optical medium. According to other embodiments, the application 522 can also be stored in a memory type system such as in firmware, read only memory (ROM), or, as in this example, as executable code within the main memory 506 (e.g., within Random Access Memory or RAM). For example, application 522 may also be stored in removable storage media 510, read-only memory 508, and/or mass storage device 512.

Those skilled in the art will understand that the computer system 500 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware, or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

CONCLUSION

As used in this description, the term "portion" means some or all. So, for example, "A portion of X" may include some of "X" or all of "X." In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs," and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only," the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only," the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y," means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs."

It should be appreciated that the words "first" and "second" in the description and claims are used to distinguish or identify, and not to show a serial or numerical limitation. Similarly, the use of letter or numerical labels (such as "(a)," "(b)," and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise," "including," "having," and "contain" and their variations should be understood as meaning "including but not limited to" and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

It will be appreciated that variations to the foregoing embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

Use of exemplary language, such as "for instance," "such as," "for example" and the like, is merely intended to better illustrate the invention and does not indicate a limitation on the scope of the invention unless so claimed. Any steps or acts described in the specification may be performed in any order or simultaneously, unless the context clearly indicates otherwise.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A computer-implemented method comprising:
   (A) training a first avatar mechanism using a first corpus of information, wherein said training generates a first multi-dimensional input vector representing the first corpus, wherein first said multi-dimensional input vector comprises a plurality of particular input vectors, each of said particular input vectors corresponding to an item in the first corpus;
   (B) obtaining a search query;
   (C) based on said search query, performing a perspective search, said perspective search comprising comparing the first multi-dimensional input vector against a collection of information;
   (D) personalizing results of the perspective search based on the first avatar mechanism to produce results based on a perspective of the first avatar mechanism; and
   (E) providing the results of the search.

2. The method of claim 1, wherein the first corpus of information comprises information associated with a first set of one or more people.

3. The method of claim 2, wherein the first set of one or more people comprises a first particular person.

4. The method of claim 3, wherein the results of the search are based on a perspective of the first particular person, as determined by the first avatar mechanism.

5. The method of claim 3, wherein a perspective of the first avatar mechanism emulates a particular perspective of the first particular person,
   and wherein the first corpus of information comprises at least some information associated with the first particular person.

6. The method of claim 3, wherein the information associated with the first particular person comprises one or more of: books, magazine articles, online posts, social network posts, blog posts, social media posts, digitized books, and/or transcribed videos of or by or including the first particular person.

7. The method of claim 1, wherein the providing comprises filtering and/or sifting a set of search results based on the perspective of the first avatar mechanism.

8. The method of claim 1, further comprising:
   (F) using a second avatar mechanism to evaluate the results of the search, wherein the second avatar mechanism was trained using a second corpus of information, wherein training of said second avatar mechanism generates a second multi-dimensional input vector representing the second corpus, wherein said second multi-dimensional input vector comprises a second plurality of second particular input vectors, each of said second particular input vectors corresponding to an item in the second corpus.

9. The method of claim 8, wherein the using comprises: determining whether the second avatar mechanism agrees with the first avatar mechanism.

10. The method of claim 8, wherein the second corpus of information comprises second information associated with a second set of one or more people.

11. The method of claim 10, wherein the second set of one or more people comprises a second particular person.

12. The method of claim 9, wherein at least some of the results of the search are provided in a user interface, and wherein agreement of the second avatar mechanism with the first avatar mechanism is indicated in the user interface.

13. At least one non-transitory computer-readable medium with one or more computer programs stored therein that, when executed by one or more processors, cause the one or more processors to perform at least the operations of the method of claim 1.

14. An article of manufacture comprising at least one non-transitory computer-readable medium having computer-readable instructions stored thereon, the computer-readable instructions including instructions for implementing a computer-implemented method, said method operable on a device comprising hardware including memory and at least one processor and running a service on said hardware, the method comprising the method of claim 1.

15. A device, comprising:
(a) hardware including memory and at least one processor, and
(b) a service running on said hardware, wherein said service is configured to:
perform the method of claim 1.

16. A computer-implemented method comprising:
(A) for each particular avatar mechanism of one or more avatar mechanisms, training said particular avatar mechanism using a corresponding particular corpus of information, wherein said training generates a particular multi-dimensional input vector representing the corresponding particular corpus, wherein a given multi-dimensional input vector comprises a plurality of particular input vectors, each of said particular input vectors corresponding to an item in the corresponding particular corpus of information;
(B) obtaining a search query;
(C) based on said search query, performing a perspective search based on a corresponding perspective of at least one of one or more avatar mechanisms;
(D) personalizing results of the search based on the at least one of the one or more avatar mechanisms to produce personalized results based on the perspective of the at least one of one or more avatar mechanisms; and
(E) providing at least some results of the perspective search.

17. The method of claim 16, further comprising:
evaluating a result of the perspective search based on a corresponding perspective of at least one other of the one or more avatar mechanisms.

18. The method of claim 16, further comprising:
providing an indication of agreement between the at least some results and the at least one other of the one or more avatar mechanisms.

19. The method of claim 16, wherein the corresponding corpus of information for each avatar mechanism comprises information associated with a corresponding one or more people.

20. The method of claim 19, wherein the corresponding one or more people comprise a particular person.

21. The method of claim 19, wherein the information associated with the corresponding one or more people comprises one or more of: books, magazine articles, online posts, social network posts, blog posts, social media posts, digitized books, and/or transcribed videos of or by or including the corresponding one or more people.

22. The method of claim 16, wherein the at least some results of the perspective search are based on a perspective of at least one particular person, as determined by the at least one of the one or more avatar mechanisms.

23. At least one non-transitory computer-readable medium with one or more computer programs stored therein that, when executed by one or more processors, cause the one or more processors to perform at least the operations of the method of claim 16.

24. An article of manufacture comprising at least one non-transitory computer-readable medium having computer-readable instructions stored thereon, the computer-readable instructions including instructions for implementing a computer-implemented method, said method operable on a device comprising hardware including memory and at least one processor and running a service on said hardware, the method comprising the method of claim 16.

25. A device, comprising:
(a) hardware including memory and at least one processor, and
(b) a service running on said hardware, wherein said service is configured to:
perform the method of claim 16.

26. A system comprising:
one or more processors configured to:
(A) train a first avatar mechanism using a first corpus of information, wherein said training generates a first multi-dimensional input vector representing the first corpus, wherein first said multi-dimensional input vector comprises a plurality of particular input vectors, each of said particular input vectors corresponding to an item in the first corpus;
(B) obtain a search query;
(C) based on said search query, perform a perspective search, said perspective search comprising comparing the first multi-dimensional input vector against a collection of information;
(D) personalize results of the perspective search based on the first avatar mechanism to produce results based on a perspective of the first avatar mechanism; and
(E) provide the results of the search.

27. The system of claim 26, wherein the first corpus of information comprises information associated with a first set of one or more people.

28. The system of claim 27, wherein the first set of one or more people comprises a first particular person, and wherein the results of the search are based on a perspective of the first particular person, as determined by the first avatar mechanism.

29. The system of claim 28, wherein the first corpus of information comprises at least some information associated with the first particular person, and wherein a perspective of the first avatar mechanism emulates a particular perspective of the first particular person, wherein the information associated with the first particular person comprises one or more of: books, magazine articles, online posts, social network posts, blog posts, social media posts, digitized books, and/or transcribed videos of or by or including the first particular person.

30. The system of claim 26, wherein the providing comprises filtering and/or sifting a set of search results based on the perspective of the first avatar mechanism.

31. The system of claim 26, wherein the one or more processors are further configured to:
(F) use a second avatar mechanism to evaluate the results of the search, wherein the second avatar mechanism was trained using a second corpus of information, wherein training of said second avatar mechanism generates a second multi-dimensional input vector representing the second corpus, wherein said second multi-dimensional input vector comprises a second plurality of second particular input vectors, each of said second particular input vectors corresponding to an item in the second corpus, wherein the second corpus of information comprises second information associated with a second set of one or more people, wherein the second set of one or more people comprises a second particular person, and wherein using the second avatar mechanism in (F) comprises:

determining whether the second avatar mechanism agrees with the first avatar mechanism.

32. The system of claim 31, wherein at least some of the results of the search are provided in a user interface, and wherein agreement of the second avatar mechanism with the first avatar mechanism is indicated in the user interface.

\* \* \* \* \*